(12) United States Patent
Zhu

(10) Patent No.: US 7,424,293 B2
(45) Date of Patent: Sep. 9, 2008

(54) USER PLANE LOCATION BASED SERVICE USING MESSAGE TUNNELING TO SUPPORT ROAMING

(75) Inventor: Yinjun Zhu, King, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 139 days.

(21) Appl. No.: 10/724,773

(22) Filed: Dec. 2, 2003

(65) Prior Publication Data

US 2005/0118999 A1 Jun. 2, 2005

(51) Int. Cl.
*H04Q 7/20* (2006.01)
(52) U.S. Cl. .............. 455/432.1; 455/456.1; 455/456.3; 455/456.2; 455/433; 455/435.1; 455/435.2; 455/436; 455/439; 455/440; 455/443
(58) Field of Classification Search .............. 455/432.1, 455/456.1, 456.6, 456.3, 456.2, 433, 435.1, 455/435.2, 436, 439, 440, 443; 370/331, 370/338; 713/168, 200, 201
See application file for complete search history.

(56) References Cited

U.S. PATENT DOCUMENTS

| | | | |
|---|---|---|---|
| 1,103,073 A | 7/1914 | O'Connell |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 4,972,484 A | 11/1990 | Theile et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,239,570 A | 8/1993 | Koster |
| 5,265,630 A | 11/1993 | Hartmann |
| 5,266,944 A | 11/1993 | Carroll et al. |

(Continued)

OTHER PUBLICATIONS

U.S. Appl. No. 09/539,495, filed Mar. 2000, Abrol.

(Continued)

*Primary Examiner*—David Q Nguyen

(57) ABSTRACT

An improved User Plane location based service (LBS) architecture and message flow, enabling seamless User Plane location based services even when a mobile or wireless device has roamed among different carrier networks. The present invention overcomes constraints inherent in the current protocol for roaming support defined by the Secure User Plane Location Service specification. A location system is enabled to automatically fall back to a message tunneling mechanism to ensure the security of a communication path between the location service system and the target wireless device, ensuring that the communication path is uninterrupted as the wireless device travels.

15 Claims, 5 Drawing Sheets

U.S. PATENT DOCUMENTS

| | | |
|---|---|---|
| 5,283,570 A | 2/1994 | DeLucca |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki |
| 5,325,302 A | 6/1994 | Izidon et al. |
| 5,327,529 A | 7/1994 | Fults et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,494,091 A | 2/1996 | Freeman et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway et al. |
| 5,539,398 A | 7/1996 | Hall et al. |
| 5,539,829 A | 7/1996 | Lokhoff et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,587,201 A | 12/1996 | Rho et al. |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,618 A | 2/1997 | Lokhoff et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,699,053 A | 12/1997 | Jonsson |
| 5,704,029 A | 12/1997 | Wright, Jr. |
| 5,721,781 A | 2/1998 | Deo |
| 5,740,534 A | 4/1998 | Ayerst et al. |
| 5,761,618 A | 6/1998 | Lynch et al. |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Muntully |
| 5,787,357 A | 7/1998 | Salin |
| 5,794,142 A | 8/1998 | Vanttila et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,809,415 A | 9/1998 | Rossman |
| 5,812,087 A | 9/1998 | Krasner |
| 5,822,700 A | 10/1998 | Hult et al. |
| 5,828,740 A | 10/1998 | Khuc et al. |
| 5,841,396 A | 11/1998 | Kransner |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz et al. |
| 5,922,074 A | 7/1999 | Richard et al. |
| 5,930,250 A | 7/1999 | Klok |
| 5,930,701 A | 7/1999 | Skog |
| 5,943,399 A | 8/1999 | Bannister et al. |
| 5,945,944 A | 8/1999 | Kraser |
| 5,946,629 A | 8/1999 | Sawyer |
| 5,946,630 A | 8/1999 | Willars et al. |
| 5,950,130 A | 9/1999 | Coursey |
| 5,953,398 A | 9/1999 | Hill |
| 5,960,362 A | 9/1999 | Grob |
| 5,974,054 A | 10/1999 | Couts et al. |
| 5,978,685 A | 11/1999 | Laiho |
| 5,983,099 A | 11/1999 | Yao et al. |
| 5,987,323 A | 11/1999 | Huotari |
| 5,998,111 A | 12/1999 | Abe |
| 5,999,124 A | 12/1999 | Sheynblat |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A * | 5/2000 | Nordman .................... 370/352 |
| 6,064,336 A | 5/2000 | Krasner |
| 6,064,875 A | 5/2000 | Morgan |
| 6,070,067 A | 5/2000 | Nguyen et al. |
| 6,075,982 A | 6/2000 | Donovan et al. |
| 6,081,229 A | 6/2000 | Soliman |
| 6,081,508 A | 6/2000 | West et al. |
| 6,085,320 A | 7/2000 | Kaliski, Jr. |
| 6,101,378 A | 8/2000 | Barabash et al. |
| 6,104,931 A * | 8/2000 | Havinis et al. .......... 455/456.5 |
| 6,122,503 A | 9/2000 | Daly |
| 6,122,520 A | 9/2000 | Want et al. |
| 6,124,810 A | 9/2000 | Segal et al. |
| 6,131,067 A | 10/2000 | Girerd |
| 6,133,874 A | 10/2000 | Krasner |
| 6,134,483 A | 10/2000 | Vayanos et al. |
| 6,148,197 A | 11/2000 | Bridges et al. |
| 6,148,198 A | 11/2000 | Anderson et al. |
| 6,149,353 A | 11/2000 | Nilsson |
| 6,150,980 A | 11/2000 | Krasner |
| 6,169,891 B1 | 1/2001 | Gorham et al. |
| 6,173,181 B1 | 1/2001 | Losh |
| 6,178,505 B1 * | 1/2001 | Schneider et al. .......... 713/168 |
| 6,178,506 B1 | 1/2001 | Quick, Jr. |
| 6,181,935 B1 | 1/2001 | Gossman et al. |
| 6,185,427 B1 | 2/2001 | Krasner |

| | | | | | | |
|---|---|---|---|---|---|---|
| 6,188,354 | B1 | 2/2001 | Soliman et al. | 6,584,552 B1 | 6/2003 | Kuno |
| 6,188,752 | B1 | 2/2001 | Lesley | 6,594,500 B1 | 7/2003 | Bender et al. |
| 6,188,909 | B1 | 2/2001 | Alanara | 6,597,311 B2 | 7/2003 | Sheynblat et al. |
| 6,189,098 | B1 | 2/2001 | Kaliski, Jr. | 6,606,495 B1 | 8/2003 | Korpi et al. |
| 6,198,431 | B1 | 3/2001 | Gibson | 6,606,554 B2 | 8/2003 | Edge |
| 6,199,045 | B1 | 3/2001 | Giniger et al. | 6,609,004 B1 | 8/2003 | Morse et al. |
| 6,199,113 | B1 * | 3/2001 | Alegre et al. ............... 709/229 | 6,611,757 B2 | 8/2003 | Brodie |
| 6,205,330 | B1 | 3/2001 | Windbladh | 6,618,670 B1 | 9/2003 | Chansarkar |
| 6,208,290 | B1 | 3/2001 | Krasner | 6,621,452 B2 | 9/2003 | Knockeart et al. |
| 6,208,854 | B1 | 3/2001 | Roberts et al. | 6,628,233 B2 | 9/2003 | Knockeart et al. |
| 6,215,441 | B1 | 4/2001 | Moeglein | 6,630,093 B1 | 10/2003 | Jones |
| 6,219,557 | B1 * | 4/2001 | Havinis .................. 455/456.4 | 6,633,255 B2 | 10/2003 | Krasner |
| 6,223,046 | B1 | 4/2001 | Hamill-Keays et al. | 6,640,184 B1 | 10/2003 | Rabe |
| 6,226,529 | B1 | 5/2001 | Bruno et al. | 6,650,901 B1 | 11/2003 | Schuster et al. |
| 6,239,742 | B1 | 5/2001 | Krasner | 6,661,372 B1 | 12/2003 | Girerd |
| 6,247,135 | B1 | 6/2001 | Feague | 6,665,539 B2 | 12/2003 | Sih et al. |
| 6,249,680 | B1 | 6/2001 | Wax et al. | 6,665,541 B1 | 12/2003 | Krasner et al. |
| 6,249,744 | B1 | 6/2001 | Morita | 6,671,620 B1 | 12/2003 | Garin et al. |
| 6,249,783 | B1 | 6/2001 | Crone et al. | 6,677,894 B2 | 1/2004 | Sheynblat et al. |
| 6,260,147 | B1 | 7/2001 | Quick, Jr. | 6,678,357 B2 | 1/2004 | Stumer et al. |
| 6,266,614 | B1 | 7/2001 | Alumbaugh | 6,680,694 B1 | 1/2004 | Knockeart et al. |
| 6,275,692 | B1 | 8/2001 | Skog | 6,680,695 B2 | 1/2004 | Turetzky et al. |
| 6,275,849 | B1 | 8/2001 | Ludwig | 6,694,258 B2 | 2/2004 | Johnson et al. |
| 6,289,373 | B1 | 9/2001 | Dezonno | 6,697,629 B1 | 2/2004 | Grilli et al. |
| 6,307,504 | B1 | 10/2001 | Sheynblat | 6,701,144 B2 | 3/2004 | Kirbas et al. |
| 6,308,269 | B2 | 10/2001 | Proidl | 6,703,971 B2 | 3/2004 | Pande et al. |
| 6,313,786 | B1 | 11/2001 | Sheynblat et al. | 6,703,972 B2 | 3/2004 | van Diggelmen |
| 6,317,594 | B1 | 11/2001 | Gossman et al. | 6,704,651 B2 | 3/2004 | van Diggelmen |
| 6,321,091 | B1 | 11/2001 | Holland | 6,707,421 B1 | 3/2004 | Drury et al. |
| 6,321,250 | B1 | 11/2001 | Knape | 6,714,793 B1 | 3/2004 | Carey et al. |
| 6,321,257 | B1 | 11/2001 | Kotola | 6,718,174 B2 | 4/2004 | Vayanos |
| 6,324,542 | B1 | 11/2001 | Wright, Jr. | 6,720,915 B2 | 4/2004 | Sheynblat |
| 6,327,473 | B1 | 12/2001 | Soliman et al. | 6,721,578 B2 | 4/2004 | Minear et al. |
| 6,327,479 | B1 | 12/2001 | Mikkola | 6,721,871 B2 | 4/2004 | Piispanen |
| 6,333,919 | B2 | 12/2001 | Gafney | 6,724,342 B2 | 4/2004 | Bloebaum et al. |
| 6,873,854 | B2 | 2/2002 | Crockett | 6,725,159 B2 | 4/2004 | Krasner |
| 6,367,019 | B1 | 4/2002 | Ansell | 6,731,940 B1 | 5/2004 | Nagendran |
| 6,370,389 | B1 | 4/2002 | Isomursu | 6,734,821 B2 | 5/2004 | van Diggelen |
| 6,377,209 | B1 | 4/2002 | Krasner | 6,738,013 B2 | 5/2004 | Orler |
| 6,400,314 | B1 | 6/2002 | Krasner | 6,738,800 B1 | 5/2004 | Aquilon |
| 6,400,958 | B1 | 6/2002 | Isomursu | 6,741,842 B2 | 5/2004 | Goldberg et al. |
| 6,411,254 | B1 | 6/2002 | Moeglein | 6,744,856 B2 | 6/2004 | Karnik et al. |
| 6,421,002 | B2 | 7/2002 | Krasner | 6,745,038 B2 | 6/2004 | Callaway |
| 6,433,734 | B1 | 8/2002 | Krasner | 6,747,596 B2 | 6/2004 | Orler |
| 6,449,473 | B1 | 9/2002 | Raivisto | 6,748,195 B1 | 6/2004 | Philips |
| 6,449,476 | B1 | 9/2002 | Hutchison, IV | 6,751,464 B1 | 6/2004 | Burg et al. |
| 6,456,852 | B2 | 9/2002 | Bar et al. | 6,756,938 B2 | 6/2004 | Zhao et al. |
| 6,477,150 | B1 | 11/2002 | Maggenti | 6,757,544 B2 | 6/2004 | Rangarajan et al. |
| 6,504,491 | B1 | 1/2003 | Christians | 6,771,742 B2 | 8/2004 | McCalmont et al. |
| 6,505,049 | B1 | 1/2003 | Dorenbosch | 6,772,340 B1 | 8/2004 | Peinado |
| 6,510,387 | B2 | 1/2003 | Fuchs et al. | 6,775,655 B1 | 8/2004 | Peinado |
| 6,512,922 | B1 | 1/2003 | Burg et al. | 6,775,802 B2 | 8/2004 | Gaal |
| 6,512,930 | B2 | 1/2003 | Sandegren | 6,778,136 B2 | 8/2004 | Groneneyer |
| 6,515,623 | B2 | 2/2003 | Johnson | 6,778,885 B2 | 8/2004 | Agashe et al. |
| 6,519,466 | B2 | 2/2003 | Pande et al. | 6,779,049 B2 | 8/2004 | Altman et al. |
| 6,522,682 | B1 | 2/2003 | Kohli et al. | 6,781,963 B2 | 8/2004 | Crockett |
| 6,529,490 | B1 * | 3/2003 | Oh et al. ................ 370/331 | 6,788,249 B1 | 9/2004 | Farmer et al. |
| 6,529,829 | B2 | 3/2003 | Turetzky et al. | 6,795,699 B1 | 9/2004 | McCraw et al. |
| 6,531,982 | B1 | 3/2003 | White et al. | 6,799,049 B1 | 9/2004 | Zellner et al. |
| 6,538,757 | B1 | 3/2003 | Sansone | 6,799,050 B1 | 9/2004 | Krasner |
| 6,539,200 | B1 | 3/2003 | Schiff | 6,801,159 B2 | 10/2004 | Swope et al. |
| 6,539,304 | B1 | 3/2003 | Chansarkar | 6,804,524 B1 | 10/2004 | Vandermeijjden |
| 6,542,464 | B1 | 4/2003 | Tekeda | 6,807,534 B1 | 10/2004 | Erickson |
| 6,542,734 | B1 | 4/2003 | Abrol et al. | 6,810,323 B1 | 10/2004 | Bullock et al. |
| 6,542,743 | B1 | 4/2003 | Soliman | 6,813,560 B2 | 11/2004 | van Diggelen |
| 6,549,776 | B1 | 4/2003 | Joong | 6,816,111 B2 | 11/2004 | Krasner |
| 6,549,844 | B1 | 4/2003 | Egberts | 6,816,710 B2 | 11/2004 | Krasner |
| 6,556,832 | B1 | 4/2003 | Soliman | 6,816,719 B1 | 11/2004 | Heinonen |
| 6,560,534 | B2 | 5/2003 | Abraham et al. | 6,816,734 B2 | 11/2004 | Wong et al. |
| 6,570,530 | B2 | 5/2003 | Gaal et al. | 6,820,069 B1 | 11/2004 | Kogan et al. |
| 6,571,095 | B1 * | 5/2003 | Koodli .................. 455/435.1 | 6,829,475 B1 | 12/2004 | Lee et al. |
| 6,574,558 | B2 | 6/2003 | Kohli | 6,832,373 B2 | 12/2004 | O'Neil |
| 6,584,307 | B1 | 6/2003 | Antonucci et al. | 6,839,020 B2 | 1/2005 | Geir et al. |

| | | |
|---|---|---|
| 6,839,021 B2 | 1/2005 | Sheynblat et al. |
| 6,842,715 B1 | 1/2005 | Gaal |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor |
| 6,885,940 B2 | 4/2005 | Brodie et al. |
| 6,888,497 B2 | 5/2005 | King et al. |
| 6,888,932 B2 | 5/2005 | Snip |
| 6,895,238 B2 | 5/2005 | Nevell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,395 B2 | 6/2005 | Benes et al. |
| 6,912,545 B1 | 6/2005 | Lundy et al. |
| 6,915,208 B2 | 7/2005 | Garin et al. |
| 6,917,331 B2 | 7/2005 | Gronemeyer |
| 6,930,634 B2 | 8/2005 | Peng et al. |
| 6,937,187 B2 | 8/2005 | van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,073 B2 | 10/2005 | Bye |
| 6,961,019 B1 | 11/2005 | McConnell et al. |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao |
| 6,980,816 B2 | 12/2005 | Rohles |
| 6,996,720 B1 | 2/2006 | DeMello |
| 6,999,782 B2 | 2/2006 | Shaughnessy |
| 7,024,321 B1 | 4/2006 | Deninger et al. |
| 7,024,393 B1 | 4/2006 | Peinado |
| 7,047,411 B1 | 5/2006 | DeMello |
| 7,065,351 B2 | 6/2006 | Carter et al. |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,136,838 B1 | 11/2006 | Peinado |
| 7,151,946 B2 | 12/2006 | Maggenti |
| 7,209,969 B2 | 4/2007 | Lahti |
| 7,218,940 B2 | 5/2007 | Niemenmaa |
| 7,221,959 B2 | 5/2007 | Lindqvist |
| 2002/0037735 A1 | 3/2002 | Maggenti et al. |
| 2002/0052214 A1 | 5/2002 | Maggenti et al. |
| 2002/0061760 A1 | 5/2002 | Maggenti et al. |
| 2002/0069529 A1 | 6/2002 | Wieres |
| 2002/0102999 A1 | 8/2002 | Maggenti et al. |
| 2002/0112047 A1 | 8/2002 | Kushwaha et al. |
| 2002/0197991 A1* | 12/2002 | Anvekar et al. ............. 455/432 |
| 2003/0009602 A1 | 1/2003 | Jacobs et al. |
| 2003/0016804 A1 | 1/2003 | Sheha et al. |
| 2003/0037163 A1 | 2/2003 | Kitada et al. |
| 2003/0065788 A1 | 4/2003 | Salomaki |
| 2003/0072318 A1* | 4/2003 | Lam et al. .................... 370/428 |
| 2003/0078064 A1 | 4/2003 | Chan |
| 2003/0078886 A1 | 4/2003 | Minear et al. |
| 2003/0081557 A1 | 5/2003 | Mettala et al. |
| 2003/0101329 A1 | 5/2003 | Lahti et al. |
| 2003/0103484 A1 | 6/2003 | Oommen et al. |
| 2003/0114148 A1 | 6/2003 | Albertsson et al. |
| 2003/0115328 A1* | 6/2003 | Salminen et al. ............ 709/225 |
| 2003/0137961 A1 | 7/2003 | Tsirtsis et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0196105 A1* | 10/2003 | Fineberg ..................... 713/200 |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0044623 A1 | 3/2004 | Wake et al. |
| 2004/0068724 A1 | 4/2004 | Gardner et al. |
| 2004/0098497 A1* | 5/2004 | Banet et al. .................. 709/230 |
| 2004/0132465 A1 | 7/2004 | Mattila et al. |
| 2004/0205151 A1 | 10/2004 | Sprigg et al. |
| 2004/0229632 A1* | 11/2004 | Flynn et al. ............... 455/456.3 |
| 2004/0242238 A1* | 12/2004 | Wang et al. ............... 455/456.1 |
| 2005/0028034 A1 | 2/2005 | Gantman et al. |
| 2005/0039178 A1 | 2/2005 | Marolia |
| 2005/0041578 A1 | 2/2005 | Huotari et al. |
| 2005/0086467 A1 | 4/2005 | Asokan et al. |
| 2005/0112030 A1 | 5/2005 | Gaus |
| 2005/0209995 A1 | 9/2005 | Aksu et al. |
| 2005/0259675 A1 | 11/2005 | Tuohino et al. |
| 2006/0053225 A1 | 3/2006 | Poikselka et al. |
| 2006/0212558 A1 | 9/2006 | Sahinoja et al. |
| 2006/0212562 A1 | 9/2006 | Kushwaha et al. |
| 2006/0234639 A1 | 10/2006 | Kushwaha et al. |
| 2006/0234698 A1 | 10/2006 | Fok et al. |
| 2007/0026854 A1 | 2/2007 | Nath et al. |
| 2007/0030539 A1 | 2/2007 | Nath et al. |

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
PCTUS0146666.
PCTUS9928848.

* cited by examiner

USER PLANE LOCATION BASED SERVICE USING MESSAGE TUNNELING TO SUPPORT ROAMING

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of Related Art

It is desired to accurately locate the physical position of a wireless device (e.g., a wireless telephone) within a wireless network. There are currently two different types of architecture developed to accomplish a location based service (LSB): Control Plane location based services, and more recently User Plane location based services.

Older location based services utilize what is now called Control Plane location based services. A Control Plane location based service utilizes a management system to automate and build processes and perform inventory management. A User Plane location based service utilizes control or signaling messages to determine the location of a particular wireless device.

A key difference between these two technologies is that a Control Plane solution uses a control channel to communicate with the wireless device, while a User Plane solution uses the subscriber's traffic channel itself (e.g. IP bearer or SMS) to communicate with the wireless device. A Control Plane solution requires software updates to almost all the existing network components and wireless devices, while a User Plane solution is recognized as a more feasible solution for carriers to provide location-based services.

The concept known as User Plane location based service makes use of the user's bearer channel itself, e.g., IP bearer or SMS, to establish the communications required for initiating a positioning procedure. User Plane location based services have been introduced as an alternative location service architecture as defined in standard organizations, e.g., 3GPP.

Thus, User Plane location based services utilize contents of the communications itself to locate the wireless device. User Plane location based services focus on the TCP/IP capability of a wireless device such as a mobile telephone to generally bypass the carrier infrastructure and instead use, e.g., the Internet. There are significant advantages to the deployment of User Plane location based services, including an easier and more streamlined architecture than that of a Control Plane location based service. In this way, costly upgrades are avoided, and quick and relatively inexpensive deployment is possible using otherwise conventional system components.

In User Plane location based services, the inventors have noted that there is an issue related to location service procedure when the target mobile is roaming and IP bearer is used (IP bearer is the default bearer for User Plane location service solutions). Roaming refers to the physical movement of a wireless device among the territories covered by different wireless carriers.

In particular, based on conventional User Plane location service architecture, the target wireless device or mobile to be located must communicate with the Positioning Server (a.k.a. GMLC in 3GPP, MPC in 3GPP2) that is serving the cell where the wireless device camps. In this procedure, a PDP Context is established between the wireless device and the GGSN in the wireless device's Home Public Land Mobile Network (H-PLMN). The PDP Context is a communication channel established for the target wireless device to access IP networks, including an H-LCS Manager (a.k.a. H-GMLC in 3GPP, or H-MPC in 3GPP2), a Visited-LCS Manager (a.k.a. Visited-GMLC in 3GPP, or Visited MPC in 3GPP2), and/or a Positioning Server (a.k.a. SMLC in 3GPP, or PDE in 3GPP2).

However, the inventors herein realize that for security reasons, the IP networks of different PLMNs are separated with protective IP firewalls. Furthermore, inside a PLMN, the IP network is usually configured as a private network using private IP addresses. The IP connectivity to the Internet goes through a gateway router that provides NAT function. Yet, in currently defined User Plane location based services, a target wireless device must communicate with the positioning server in the Visited-PLMN via the GGSN in Home-PLMN, using the positioning server's private IP address provided by the Visited-LCS Manager. However, in a roaming scenario, it is realized that it is currently not permitted for a wireless device to communicate directly with a proper positioning server because of the various firewalls.

While User Plane location based solutions have been developed and deployed in a number of networks, support is not complete, especially when a GPRS IP bearer is used as the bearer. This invention introduces a methodology to resolve a key issue related to a roaming scenario for User Plane location based service solutions.

In conventional 3GPP network architectures, when a mobile initiates a packet data service session, called a PDP Context, the location SGNS will establish a connection to the GGSN indicated by an Access Point Name (APN) provided by the mobile. The GGSN identified by the APN usually resides in the Home Public Land Mobile Network (H-PLMN) of the mobile. So, in the roaming scenario, an IP bearer is established between the MS and the GGSN in the Home PLMN. Therefore, all the IP traffic to/from the mobile is tunneled to the Home PLMN.

With a Release 6 architecture of the 3GPP standard, a Gateway Mobile Location Center (GMLC) is able to communicate with other GMLCs that reside in different PLMNs, using an Lr interface. Thus, the Lr interface is allowed to go though the firewalls of PLMNs, attempting to provide adequate services in a roaming scenario.

In a typical Mobile Terminating (MT) location service in a roaming scenario, the mobile or wireless device must communicate with the local positioning server of a User Plane location based service (sometimes referred to as "SMLC" using 3GPP standards terminology), to exchange location information and request assistance and a positioning calculation depending upon the particular positioning method being used.

However, during the MT location service procedure of a conventional User Plane location based service, a wireless device will be provided with the IP address of the local positioning server. As the inventors have appreciated, usually this IP address is a private IP address. Thus, while in theory full roaming support seems to be enabled, the inventors herein have appreciated that in reality the wireless device is not always able to reach this IP host from a private network (H-PLMN) because it is protected by firewalls.

There is the need to provide roaming support for a real-world subscriber utilizing a User Plane location based service in an existing GPRS network architecture.

SUMMARY OF THE INVENTION

In accordance with the principles of the present invention, message tunneling mechanism enables User Plane location service seamlessly supporting location based service even when the target subscriber is roaming in different networks.

In one aspect of the invention, a method of providing a User Plane location based service to a roaming wireless device comprises establishing a roaming interface between a home LCS manager of a home wireless carrier network and a visited LCS manager of a currently visited wireless carrier network. IP connectivity is directed over the Internet with the capability of being transmitted through a firewall in the home wireless carrier network and through a firewall in the visited wireless carrier network. A message tunneling mechanism is provided to provide an uninterrupted communication path between a location service system and a wireless device being located.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to the provision of an improved User Plane location based service (LBS) architecture and message flow, enabling seamless User Plane location based services even when a mobile or wireless device has roamed among different carrier networks.

The present invention overcomes constraints inherent in the current protocol for roaming support defined by the Secure User Plane Location Service specification.

The inventive solution enables a location system to automatically fall back to a message tunneling mechanism to ensure the security of a communication path between the location service system and the target wireless device, ensuring that the communication path is uninterrupted as the wireless device travels.

Figure 1:
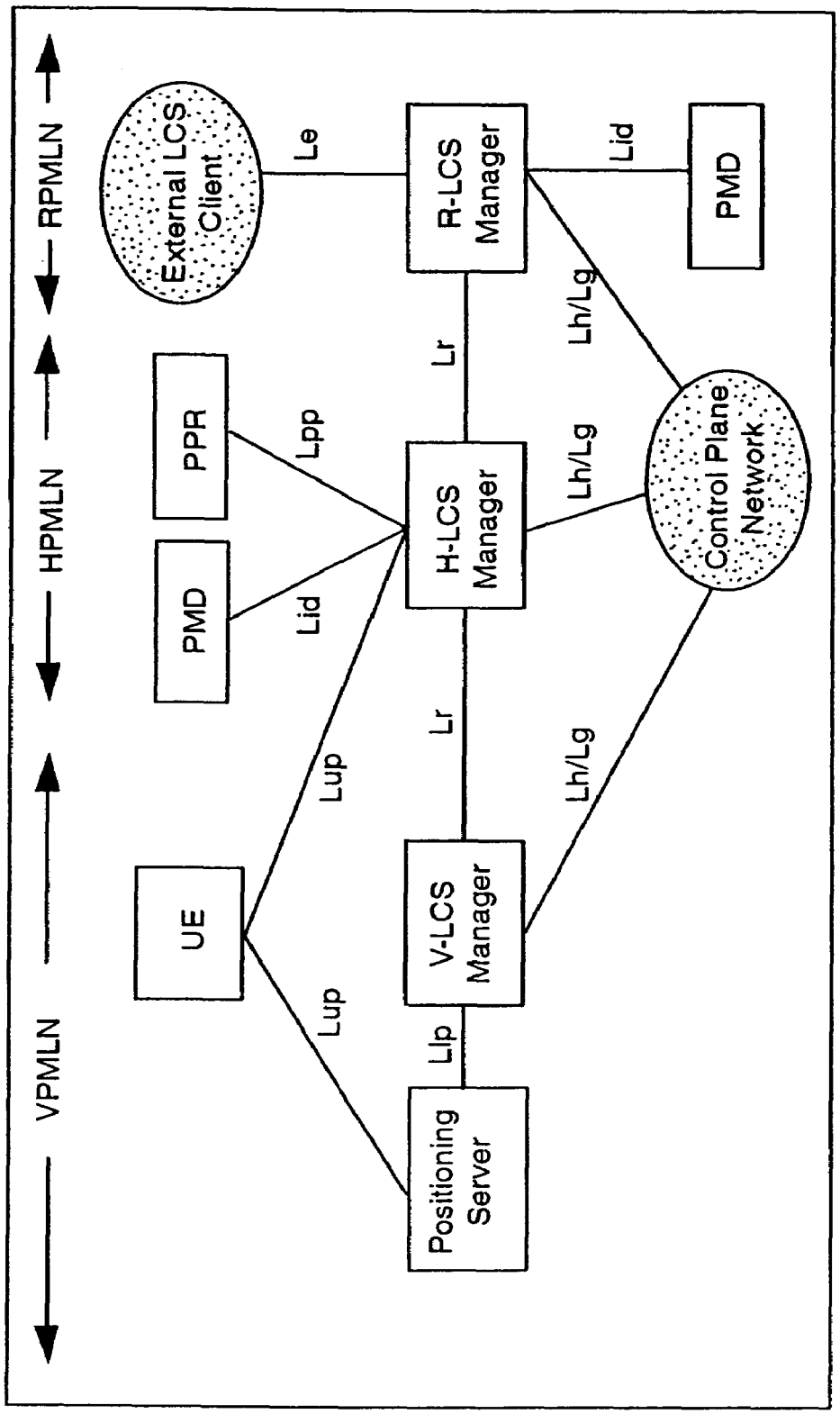
FIG. 1 shows conventional control plane location service architecture.

FIG. 1 shows an exemplary user plane location service architecture in accordance with an embodiment of the present invention.

In particular, as shown in FIG. 1, a roaming interface (Lr) is established between LCS Managers (a.k.a. GMLCs in 3GPP, or MPCs in 3GPP2), which can direct IP connectivity through firewalls via the Internet. The inventive solution implements a message tunneling mechanism to provide end-to-end protocol connectivity via a Home-LCS Manager and/or a Visited-LCS Manager.

An important concept introduced by the present invention is the use of a messaging level tunneling via GMLCs using the Lr interface. With this method, a wireless device can communicate with the local positioning server, crossing PLMNs, to complete the requested User Plane positioning procedure.

Figure 2:
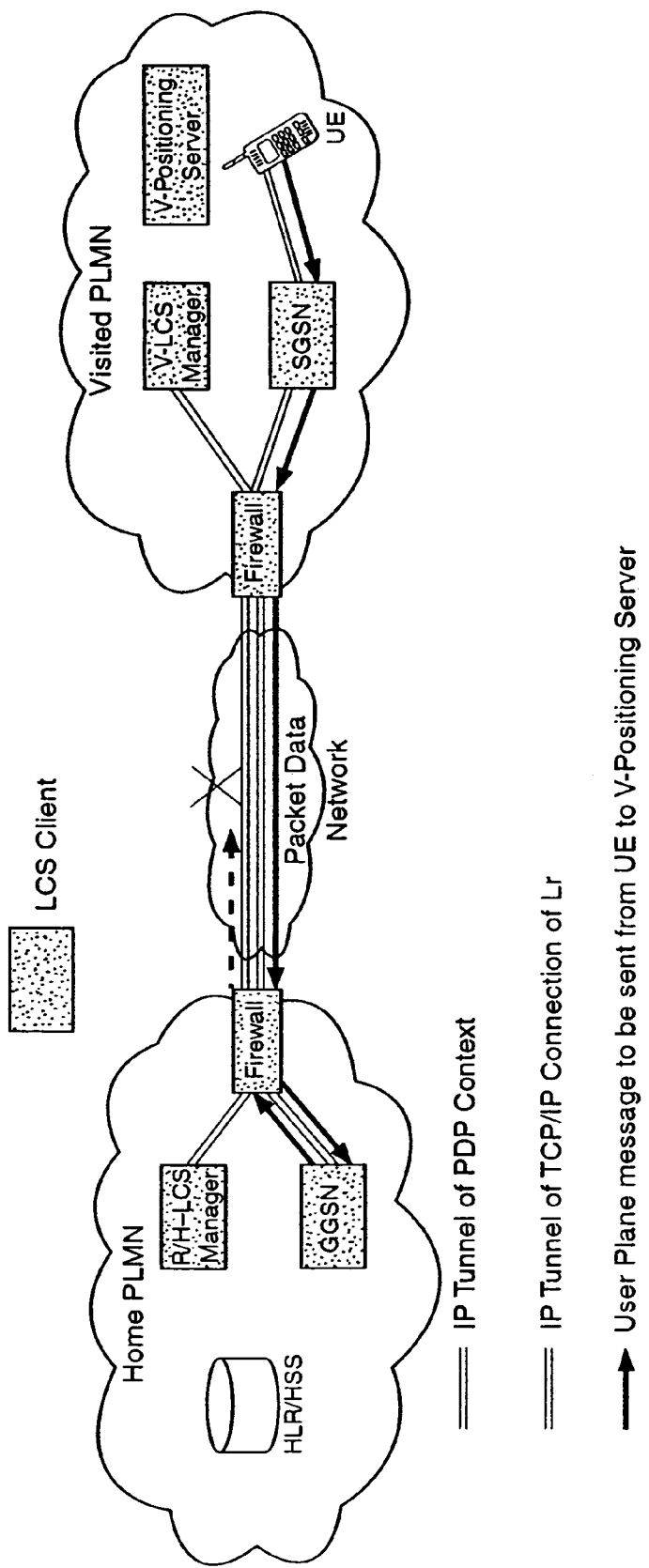
FIG. 2 shows conventional user plane location service signaling based on the user plane location service shown in FIG. 1.

FIG. 2 shows exemplary existing user plane location service signaling based on the user plane location service accordance shown in FIG. 1.

In particular, as shown in FIG. 2, when roaming UE needs to communicate with V-Positioning Server that resides in Visited PLMN, based on the procedure defined in User Plane LCS, it cannot even establish a TCP connection with the V-Positioning Server, although they are physically in the same network. Therefore, current User Plane architecture cannot support roaming scenarios for the mobile networks using private IP address assignments (which is very common in the industry due to the limited resource of IP addresses).

Figure 3:
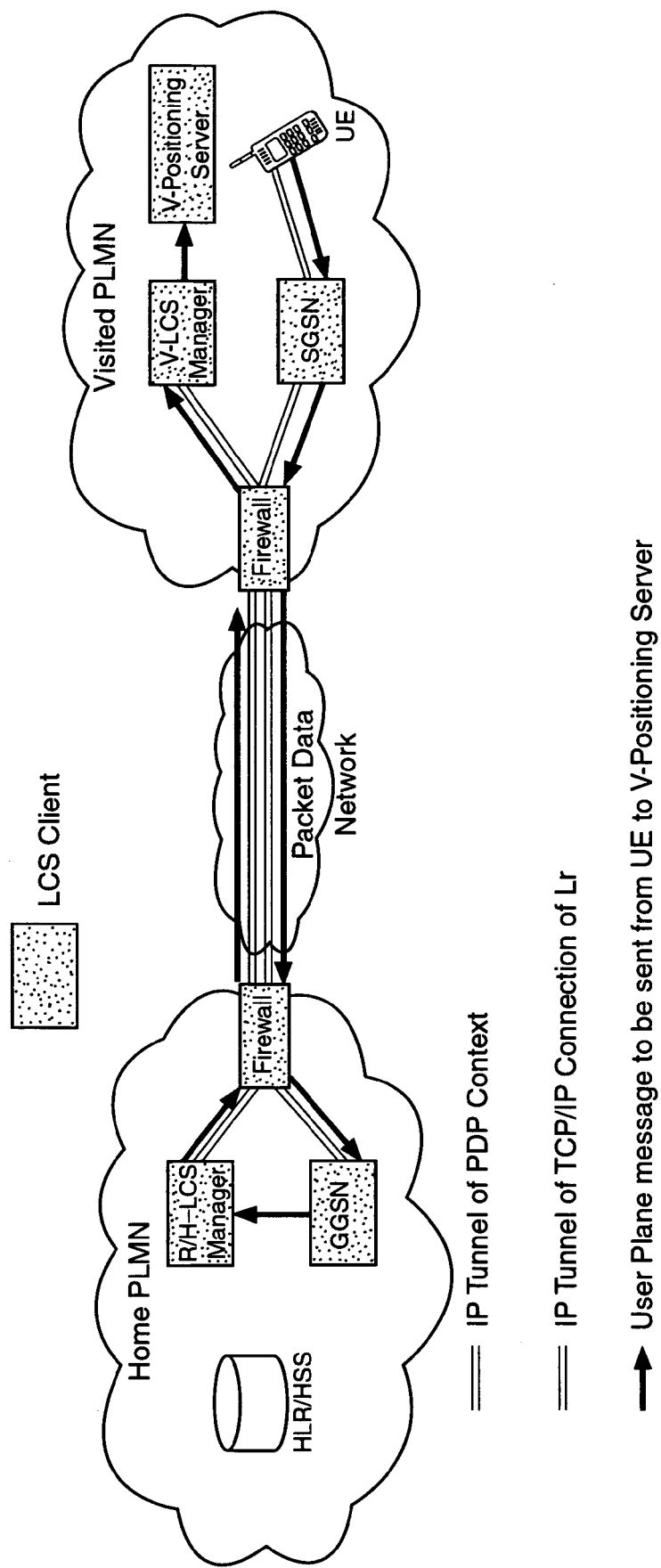
FIG. 3 shows exemplary enhanced user plane location service signaling using a message-tunneling mechanism, in accordance with the principles of the present invention.

FIG. 3 shows exemplary enhanced user plane location service signaling using message-tunneling mechanism, based on the user plane location service accordance shown in FIG. 1.

In particular, FIG. 3 illustrates the concept of message tunneling for User Plane LCS service in roaming scenarios. In this case, UE sends a User Plane message, which should be sent to the V-Positioning Server, to the Home-LCS Manager instead. The Home-LCS Manager encapsulates the received message in a generic message and sends it to the V-LCS Manager. With existing 3GPP Release 6 architecture, a LCS Managers (a.k.a GMLC in 3GPP) is able to communicate with other LCS Managers (or GMLCs) that reside in different PLMNs, using Lr interface, i.e. Lr interface is allowed to go though the firewalls of PLMNs. The V-LCS Manager also uses message tunneling mechanism to pass the message from the UE to the V-Positioning Server, via local IP network connectivity.

Figure 4:
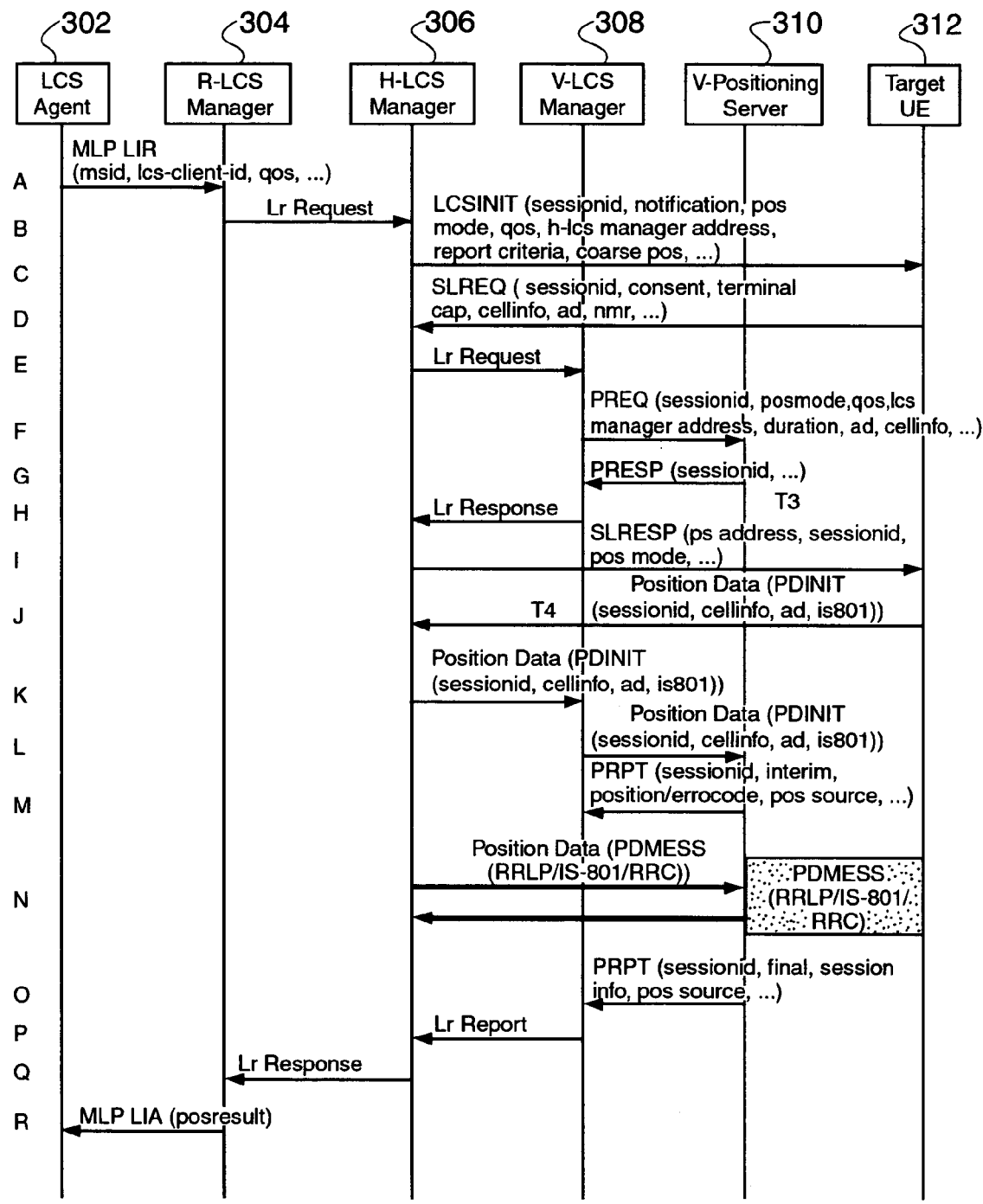
FIG. 4 shows an exemplary message flow for message tunneling to support roaming in a User Plane location based service, in accordance with the principles of the present invention.

FIG. 4 shows an exemplary message flow for message tunneling to support roaming in a User Plane location based service, in accordance with the principles of the present invention.

Step A

As shown in step A of FIG. 4, upon receiving a location request from a location service enabled application, the LCS Agent 302 may authenticate the application. If authentication is successful, the LCS Agent 302 issues an MLP Location request to the Requesting-LCS Manager 304, with which LCS Agent is associated, for an immediate location fix.

Step B

The Requesting-LCS Manager 304 authenticates the LCS Agent 302, and verifies that the LCS Agent 302 is authorized for the service it requests, based on the Ics-client-id received.

By examining the received msid of the target subscriber, the R-LCS Manager 304 can identify the relevant Home-LCS Manager 306 based, e.g., on roaming agreements, or using domain name service (DNS) lookup mechanism similar to IETF RFC 2916. The mechanisms used to identify the relevant Home-LCS Manager 306 are known to those of ordinary skill in the art.

The R-LCS Manager 304 then forwards the location request to the Home-LCS Manager 306 of the target subscriber, using an Lr interface.

Step C

Upon receipt of a location request, the Home-LCS Manager 306 applies subscriber Privacy against Ics-client-id, requestor-id, qos, etc. that are received in the request. This use case assumes privacy check success. If the LCS Manager 304 did not authorize the application, step N will be returned with the applicable MLP return code.

The H-LCS Manager 306 then initiates the location processing with the user equipment (UE) 312 using a suitable LCS INIT message, e.g., a wireless application protocol (WAP) PUSH, or a short messaging system (SMS) Trigger, and starts a timer T1.

The H-LCS Manager 306 can optionally provide UE coarse position information to the UE at this time if the H-LCS Manager 306 has knowledge of the coarse position.

If the result of the privacy check in Step B indicates that notification or verification to the target subscriber is needed, the H-LCS Manager 306 may also include a notification element in the LCS INIT message.

Step D

If Notification/Verification is required, UE popup text may be used to notify the subscriber who is requesting his/her location info, e.g., lcs-client-id, requestor-id, request-type, etc. Optionally, the subscriber may be allowed to either grant the location request or deny the location request.

If the target subscriber grants the location request, the UE 312 starts the positioning procedure by retrieving the current serving cell information, TA, NMR, and mobile device capabilities. The UE 312 then initiates a location session with the H-LCS Manager 306 using Start Location Request (SLREQ), with cell info and optional AD, TA and NMR if the UE needs to obtain assistance data, and/or TA and NMR are available. Optionally, the UE 312 also indicates whether the target subscriber has been granted access when verification is required in the LCS INIT message.

If the target subscriber denies the location request, the UE 312 initiates a location response to the H-LCS Manager 306 including indication of the denial.

When the H-LCS Manager 306 receives the SLREQ message from the target subscriber for the pending transaction, it stops the timer T1.

Step E

If the target subscriber has denied the location request in Step D, Step L will be returned with the applicable MLP return code. In this case, Steps E to K are skipped. Otherwise, with the cell information from the target UE 312 (or via another mechanism), the H-LCS Manager 306 can determine that the target UE 312 is roaming. Based on a relevant roaming agreement, or using a DNS lookup mechanism similar to IETF RFC 2916, the H-LCS Manager 306 can identify the Visited-LCS Manager 308, and initiates an Lr request to the Visited-LCS Manager 308, with an indicator that message tunneling mechanism will be used for this transition.

Step F

When receiving the Lr request, the Visited-LCS Manager 308 initiates a Position Request (PREQ), with optional cellinfo, NMR, device cap, etc., to the Positioning Server 310 that serves the area where target UE 312 currently is located.

Step G

The Positioning Server 310 sends a Position Response (PRESP) back to the V-LCS Manager 308, and confirms that the Positioning Server 310 is ready to process the location request identified by sessionid.

Step H

Upon receipt of the Position Response message, the V-LCS Manager 308 sends an Lr Response message to the H-LCS Manager 306. The Lr Response message may include, e.g., the IP address (URL) of the Positioning Server 310.

Step I

Upon receiving the confirmation of the PRESP message from the serving Positioning Server 310, the H-LCS Manager 306 sends a Start Location Response (SLRESP) message with the address of the H-LCS Manager 306 instead of V-Positioning Server for non-roaming scenario, if direct communication between the serving Positioning Server 310 and the target UE 312 is required, and an optional posmode to the target UE 312.

Note, importantly, that the provided address of the serving Positioning Server 310 may be a private IP address in the roaming scenario.

Step J

Upon detection of roaming for the relevant UE 312, the target UE 312 initiates position determination, e.g., Position Determination Initiation (PDINIT), and sessionid, to the H-LCS Manager 306. The PDINIT message optionally contains additional information, e.g., cell id, ad, and/or IS-801 PDU.

Step K

When receiving the message, the H-LCS Manager 306 forwards the PDINIT message inside a Position Data message corresponding to the sessionid to the V-LCS Manager 308 via the relevant Lr connection.

Step L

The V-LCS Manager 308 forwards the received Position Data message to the serving Positioning Server 310.

Step M

The Positioning Server 310 and the target UE 312 start a precise positioning procedure by exchanging Position Determination Messaging (PDMESS) messages encapsulated by Position Data as illustrated in Steps J, K and L, via the H-LCS Manager 306 and the V-LCS Manager 308.

Importantly, the positioning procedure itself may be, e.g., an RRLP, IS-801, or RRC based transaction. However, the positioning procedure (e.g., RRLP, IS-801 or RRC) protocol is tunneled in PDMESS messages, which are tunneled by generic Position Data messages that are transported between H-LCS Manager and V-LCS Manager.

Step N

The Positioning Server 310 may send a Position Report (PRPT) to the R/HN-LCS Managers 304, 306, 308 with the determined location information from the target UE 312.

Steps O,P

Upon receiving the required position estimates from the Position Report (PRPT), the Visited-LCS Manager 308 forwards the location estimate to the Home-LCS Manager 306 using an Lr response message.

Step Q

The Home-LCS Manager 306 forwards the location estimate to the Requesting-LCS Manager 304 if the location estimate is allowed by the privacy settings of the target subscriber.

Step R

Finally, the Requesting-:LCS Manager 304 sends an MLP SLIA message with location estimates back to the LCS Agent 302.

Figure 5:
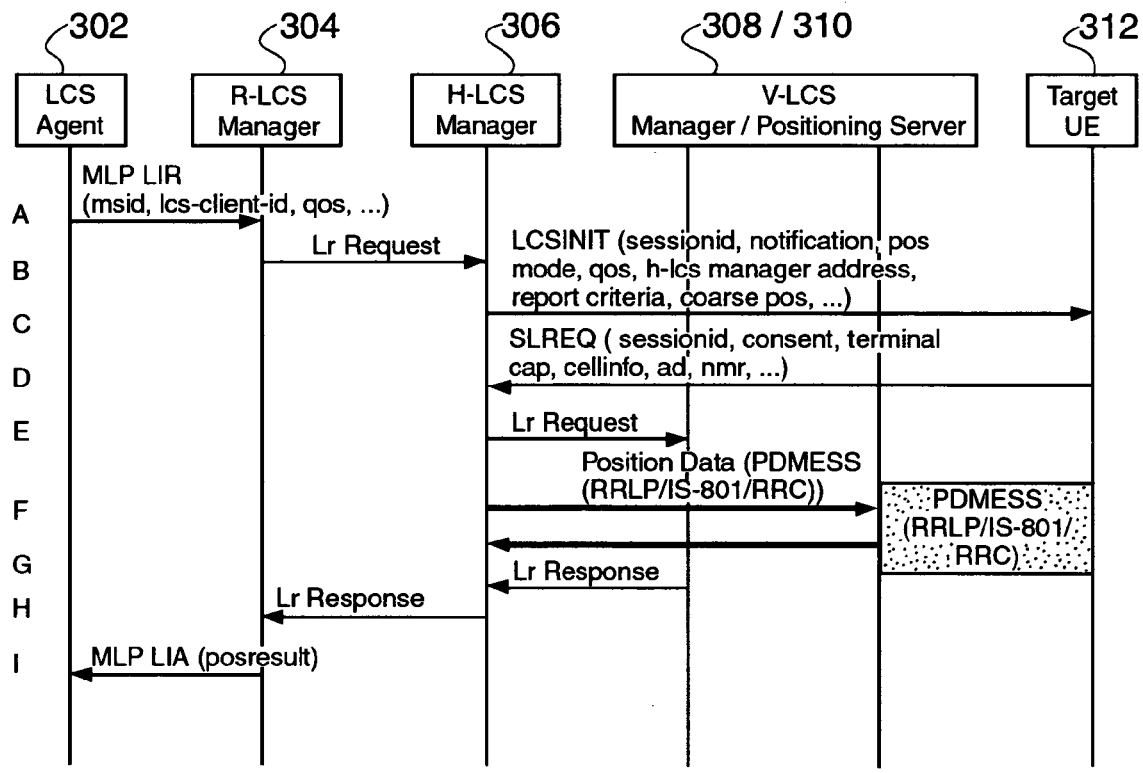
FIG. 5 shows an exemplary message flow for message tunneling to support roaming in a User Plane location based service, where Visited-LCS Manager and Visited-Positioning Server are integrated in one device, in accordance with the principles of the present invention.

FIG. 5 shows an exemplary message flow for message tunneling to support roaming in a User Plane location based service, where Visited-LCS Manager and Visited-Positioning Server are integrated in one device, in accordance with the principles of the present invention.

Step A

As shown in step A of FIG. 5, upon receiving a location request from a location service enabled application, the LCS Agent 302 may authenticate the application. If authentication is successful, the LCS Agent 302 issues an MLP Location request to the Requesting-LCS Manager 304, with which LCS Agent is associated, for an immediate location fix.

Step B

The Requesting-LCS Manager 304 authenticates the LCS Agent 302, and verifies that the LCS Agent 302 is authorized for the service it requests, based on the Ics-client-id received.

By examining the received msid of the target subscriber, the R-LCS Manager 304 can identify the relevant Home-LCS Manager 306 based, e.g., on roaming agreements, or using domain name service (DNS) lookup mechanism similar to IETF RFC 2916. The mechanisms used to identify the relevant Home-LCS Manager 306 are known to those of ordinary skill in the art.

The R-LCS Manager 304 then forwards the location request to the Home-LCS Manager 306 of the target subscriber, using an Lr interface.

Step C

Upon receipt of a location request, the Home-LCS Manager 306 applies subscriber Privacy against Ics-client-id, requestor-id, qos, etc. that are received in the request. This use case assumes privacy check success. If the LCS Manager 304 did not authorize the application, step N will be returned with the applicable MLP return code.

The H-LCS Manager 306 then initiates the location processing with the user equipment (UE) 312 using a suitable LCS INIT message, e.g., a wireless application protocol (WAP) PUSH, or a short messaging system (SMS) Trigger, and starts a timer T1.

The H-LCS Manager 306 can optionally provide UE coarse position information to the UE at this time if the H-LCS Manager 306 has knowledge of the coarse position.

If the result of the privacy check in Step B indicates that notification or verification to the target subscriber is needed, the H-LCS Manager 306 may also include a notification element in the LCS INIT message.

Step D

If Notification/Verification is required, UE popup text may be used to notify the subscriber who is requesting his/her location info, e.g., Ics-client-id, requestor-id, request-type, etc. Optionally, the subscriber may be allowed to either grant the location request or deny the location request.

If the target subscriber grants the location request, the UE 312 starts the positioning procedure by retrieving the current serving cell information, TA, NMR, and mobile device capabilities. The UE 312 then initiates a location session with the H-LCS Manager 306 using Start Location Request (SLREQ), with cell info and optional AD, TA and NMR if the UE needs to obtain assistance data, and/or TA and NMR are available. Optionally, the UE 312 also indicates whether the target subscriber has been granted access when verification is required in the LCS INIT message.

If the target subscriber denies the location request, the UE 312 initiates a location response to the H-LCS Manager 306 including indication of the denial.

When the H-LCS Manager 306 receives the SLREQ message from the target subscriber for the pending transaction, it stops the timer T1.

Step E

If the target subscriber has denied the location request in Step D, Step L will be returned with the applicable MLP return code. In this case, Steps E to K are skipped. Otherwise, with the cell information from the target UE 312 (or via another mechanism), the H-LCS Manager 306 can determine that the target UE 312 is roaming. Based on a relevant roaming agreement, or using a DNS lookup mechanism similar to IETF RFC 2916, the H-LCS Manager 306 can identify the Visited-LCS Manager 308, and initiates an Lr request to the Visited-LCS Manager 308, with an indicator that message tunneling mechanism will be used for this transition.

Step F

The Positioning Server 310 and the target UE 312 start a precise positioning procedure by exchanging Position Determination Messaging (PDMESS) messages encapsulated by Position Data messages, via the H-LCS Manager 306 and the V-LCS Manager 308.

Importantly, the positioning procedure itself may be, e.g., an RRLP, IS-801, or RRC based transaction. However, the positioning procedure (e.g., RRLP, IS-801 or RRC) protocol is tunneled in PDMESS messages, which are tunneled by generic Position Data messages that are transported between H-LCS Manager and V-LCS Manager.

Steps G

Upon receiving the required position estimates in Step F, the Visited-LCS Manager 308 forwards the location estimate to the Home-LCS Manager 306 using an Lr response message.

Step H

The Home-LCS Manager 306 forwards the location estimate to the Requesting-LCS Manager 304 if the location estimate is allowed by the privacy settings of the target subscriber.

Step I

Finally, the Requesting-:LCS Manager 304 sends an MLP SLIA message with location estimates back to the LCS Agent 302.

While the invention has been described with reference to the exemplary embodiments thereof, those skilled in the art will be able to make various modifications to the described embodiments of the invention without departing from the true spirit and scope of the invention.

What is claimed is:

1. A method of providing a User Plane location based service to a roaming wireless device, comprising:
    establishing a User Plane roaming interface between said roaming wireless device and a visited location service (V-LCS) manager via an intermediary home Location Services (H-LCS) manager associated with said roaming wireless device; and
    directing IP connectivity over said User Plane roaming interface between said home LCS manager and said visited LCS manager through a firewall in a home wireless carrier network and through a firewall in a visited wireless carrier network;
    whereby a message tunneling mechanism is formed to provide an uninterrupted communication path between a visited location service (V-LCS) manager and said roaming wireless device.

2. The method of providing a User Plane location based service to a roaming wireless device according to claim 1, wherein said roaming wireless device comprises:
    a mobile telephone.

3. The method of providing a User Plane location based service to a roaming wireless device according to claim 1, wherein said roaming wireless device comprises:
    a personal data assistant (PDA) device.

4. The method of providing a User Plane location based service to a roaming wireless device according to claim 1, wherein said roaming wireless device comprises:

a wireless email device.

5. The method of providing a User Plane location based service to a roaming wireless device according to claim 1, wherein said roaming wireless device comprises:
a wireless device including a camera.

6. Apparatus for providing a User Plane location based service to a roaming wireless device, comprising:
means for establishing a User Plane roaming interface between said roaming wireless device and a visited location service (V-LCS) manager via an intermediary home Location Services (H-LCS) manager associated with said roaming wireless device; and
means for directing IP connectivity over said User Plane roaming interface between said home LCS manager and said visited LCS manager through a firewall in a home wireless carrier network and through a firewall in a visited wireless carrier network;
whereby a message tunneling mechanism is formed to provide an uninterrupted communication path between a visited location service (V-LCS) manager and said roaming wireless device.

7. The apparatus for providing a User Plane location based service to a roaming wireless device according to claim 6, wherein said roaming wireless device comprises:
a mobile telephone.

8. The apparatus for providing a User Plane location based service to a roaming wireless device according to claim 6, wherein said roaming wireless device comprises:
a personal data assistant (PDA) device.

9. The apparatus for providing a User Plane location based service to a roaming wireless device according to claim 6, wherein said roaming wireless device comprises:
a wireless email device.

10. The apparatus for providing a User Plane location based service to a roaming wireless device according to claim 6, wherein said roaming wireless device comprises:
a wireless device including a camera.

11. A method of providing a User Plane location based service to a roaming wireless device, comprising:
establishing a User Plane roaming interface between said roaming wireless device and a visited location service (V-LCS) manager via an intermediary home Location Services (H-LCS) manager associated with said roaming wireless device; and
directing IP connectivity over said User Plane roaming interface between said home LCS manager and said visited LCS manager;
whereby a message tunneling mechanism is formed between a visited location service (V-LCS) manager and said roaming wireless device.

12. The method of providing a User Plane location based service to a roaming wireless device according to claim 11, wherein said roaming wireless device comprises:
a mobile telephone.

13. The method of providing a User Plane location based service to a roaming wireless device according to claim 11, wherein said roaming wireless device comprises:
a personal data assistant (PDA) device.

14. The method of providing a User Plane location based service to a roaming wireless device according to claim 11, wherein said roaming wireless device comprises:
a wireless email device.

15. The method of providing a User Plane location based service to a roaming wireless device according to claim 11, wherein said roaming wireless device comprises:
a wireless device including a camera.

* * * * *